United States Patent
Lessiak et al.

(10) Patent No.: US 11,050,726 B2
(45) Date of Patent: Jun. 29, 2021

(54) UPDATE-DRIVEN MIGRATION OF DATA (71) Applicant: NXP B.V., Eindhoven (NL)

(72) Inventors: Andreas Lessiak, Graz (AT); Josef Fruehwirth, Hamburg (DE); Jozsef Jelenka, Graz (AT); Harald Schlatte-Schatte, Graz (AT); Alexandre Frey, Hamburg (DE)

(73) Assignee: NXP B.V., Eindhoven (NL)

( * ) Notice: Subject to any disclaimer, the term of this patent is extended or adjusted under 35 U.S.C. 154(b) by 285 days.

(21) Appl. No.: 15/090,022

(22) Filed: Apr. 4, 2016

(65) Prior Publication Data
US 2017/0289115 A1    Oct. 5, 2017

(51) Int. Cl.
| | | |
|---|---|---|
| *H04L 29/00* | (2006.01) | |
| *H04L 29/06* | (2006.01) | |
| *G06F 16/21* | (2019.01) | |
| *G06F 8/52* | (2018.01) | |
| *H04W 4/80* | (2018.01) | |
| *G06F 21/57* | (2013.01) | |
| *H04W 12/30* | (2021.01) | |
| *H04W 12/47* | (2021.01) | |
| *G06F 8/65* | (2018.01) | |
| *G06F 21/62* | (2013.01) | |
| *H04B 5/00* | (2006.01) | |

(52) U.S. Cl.
CPC ......... *H04L 63/0492* (2013.01); *G06F 8/52* (2013.01); *G06F 8/65* (2013.01); *G06F 16/214* (2019.01); *G06F 21/57* (2013.01); *G06F 21/6245* (2013.01); *H04B 5/0031* (2013.01); *H04L 63/0853* (2013.01); *H04W 4/80* (2018.02); *H04W 12/35* (2021.01); *H04W 12/47* (2021.01)

(58) Field of Classification Search
CPC ....... H04L 63/0492; G06F 8/65; G06F 17/303
USPC .......................................................... 726/1
See application file for complete search history.

(56) References Cited

U.S. PATENT DOCUMENTS

| | | | |
|---|---|---|---|
| 9,179,293 B2 | 11/2015 | Mosse et al. | |
| 2007/0277168 A1 | 11/2007 | Vetillard | |
| 2014/0146055 A1* | 5/2014 | Bala | G06F 11/1402 345/501 |

(Continued)

FOREIGN PATENT DOCUMENTS

| | | |
|---|---|---|
| CN | 101650972 B | 5/2013 |
| CN | 104756076 A | 7/2015 |

(Continued)

OTHER PUBLICATIONS

Extended European Search Report for Patent Appln. No. 17155365.4 (dated Jul. 11, 2017).

*Primary Examiner* — Morshed Mehedi
*Assistant Examiner* — Michael D Anderson (57) ABSTRACT

A current operating system that is stored in a persistent storage circuit of a secure element is replaced by receiving a set of migration rules that specify changes to a set of data object types. Based upon the set of migration rules, a migration engine identifies data objects stored in a persistent storage circuit and corresponding to the set of data object types. For each of the identified data objects: a subset of the migration rules are selected that correspond to a data object type that corresponds to a particular data object, and based upon the selected subset, the particular data object is transformed. A new operating system can then be enabled.

20 Claims, 4 Drawing Sheets

(56) References Cited

U.S. PATENT DOCUMENTS

2014/0195564 A1* 7/2014 Talagala .............. G06F 12/0804
                                                    707/802
2015/0172255 A1* 6/2015 Warnez ................ H04W 4/001
                                                    713/168

FOREIGN PATENT DOCUMENTS

| CN | 105354507 A | 2/2016 |
|---|---|---|
| WO | WO2015102944 A1 | 7/2015 |

* cited by examiner

UPDATE-DRIVEN MIGRATION OF DATA

OVERVIEW

Aspects of various embodiments are directed migrating stored data to accommodate for updates to software, such as updates to operating systems that use a secure element (SE). Certain specific implementations can be used in connection with Near Field Communication (NFC).

NFC is a particular kind of wireless communication that works when two devices are brought in close proximity. NFC is a specialized subset of radio frequency identification (RFID). It operates at 13.56 MHz and performs many of the same functions as RFID tags and contactless smartcards. NFC operates in one of three communication modes: Read/Write, Peer-to-Peer, and Card Emulation.

Certain NFC applications require security, including those relating to financial transactions, or other applications that store and use sensitive data, whether the data is financial, personal, or otherwise. Various NFC devices use a "secure element" (SE) within the device (e.g., smart phone) to securely store sensitive data (e.g., financial account numbers) and applications.

Secure elements (SE) can be used in a variety of different devices, which may or may not also use NFC. The expanded use includes deployment in mobile devices. As SE use continues to expand, there is the potential for a large number of SEs to be in use at any given time. Updates to the SEs can be problematic if the update procedure is not readily scalable.

These and other matters have presented challenges to efficiencies of updating software used by SEs, and for a variety of related applications.

SUMMARY

Various example embodiments are directed to issues such as those addressed above and/or others which may become apparent from the following disclosure concerning updating of software, and particularly relating to operating system (OS) updates, within SEs.

In certain example embodiments, aspects of the present disclosure involve transformation of data objects using migration rules that are defined relative to a corresponding OS update.

In more certain embodiments consistent with the present disclosure, a method involves the replacement of a current operating system stored in a persistent storage circuit of a secure element. The method includes receiving a set of migration rules that specify changes to a set of data object types. Based upon the set of migration rules, data objects are identified that are stored in a persistent storage circuit and that correspond to the set of data object types. For each of the identified data objects: a subset of the migration rules are selected and transformed. The subset of migration rules correspond to a data object type that corresponds to a particular data object. Based upon the selected subset, the particular data object is transformed. A new operating system is also enabled.

In another various embodiments consistent with the present disclosure, an apparatus includes a secure element circuit. The secure element circuit includes a persistent storage circuit that is configured to store data objects and a current operating system. The secure element circuit also includes a processor circuit coupled to the persistent storage and configured to: receive a set of migration rules that specify changes to a set of data object types; identify, based upon the set of migration rules, data objects stored in a persistent storage circuit and corresponding to the set of data object types; for each of the identified data objects: select a subset of the migration rules that correspond to a data object type that corresponds to a particular data object, and transform, based upon the selected subset, the particular data object; and enable a new operating system.

In certain embodiments, a computer-implemented method generates a set of migration rules for updating a current operating system stored in a persistent storage circuit of a secure element to a new operating system. The method includes receiving operating system metadata for the current operating system and the new operating system, the metadata describing object type definitions; correlating, based upon the metadata, object types in the current operating system with a new operating system; identifying differences between correlated the object types; generating, based upon the identified differences, a set of migration rules that specify changes to objects corresponding to the correlated object types; and broadcasting the set of migration rules and the new operating system to a plurality of secure elements.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the migration of data objects, where the migration is driven by software updates. In certain implementations, aspects of the present disclosure have been shown to be beneficial when used in the context of an update to an OS and corresponding migration of data objects that are stored within a secure element (SE) upon which the OS runs. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed toward the migration of data objects to accommodate a new OS that uses the data objects. The migration can include, among other things, redefining existing data objects as well as creating or deleting data objects. Particular embodiments allow the migration to be performed on data residing in an SE and without the data having to leave the SE. Moreover, various embodiments are directed toward the ability to update a large number of devices using a standard update package that can be broadcast to each of the secure devices that include the SE.

As used herein, an SE includes a secure memory and execution environment. The SE provides an environment where application code and application data is stored. The stored applications are securely executed within the environment. Particular examples of an SE are implemented within highly secure crypto chips that include various tamper resistant features. The SE can be configured to provide encryption, decryption, and signatures for data packets communicated externally to the SE. A few example uses for an SE include a secure smart card chip (referred to as an embedded secure element), as part of a subscriber identity module (SIM) card of mobile phones (to authenticate subscribers and maintain personalized subscriber information and applications), or in a secure digital (SD) card that can be inserted in the mobile phone. Thus, an SE can provide a tamper-resistant platform (e.g., secure microcontroller on a single chip) that can host applications and sensitive data (e.g., encryption key management). Example form factors for an SE include: Universal Integrated Circuit Card (UICC), embedded SE, and microSD.

SEs can be used for many applications, including in many mobile devices, as part of the automotive market, and in Internet of Things (IoT) devices, etc. In a particular example, an SE can be used to store user credentials and credit card information, such as might be used for contactless payment solutions. The OS of these SEs can be updated from time to time in order to fix problems and to change functionality offered by the SE. When updating an OS on a SE, loss of data stored on the SE can be problematic. For example, the loss of user data might result in a user needing to re-apply for a credit card or backend server needing to install and personalize an application. While some updates may not require changes to the data structures stored within the SE, many updates (particularly those involving new features, performance optimizations, and bigger bug fixes) do require changes to the data structures. In particular, an OS that has significant changes to the data structures can cause the existing user data stored on the SE to be rendered unusable. Various embodiments of the present disclosure are directed toward a migration solution that transforms the existing data objects on the SE so that they will be compliant to a new OS. According to particular embodiments and for security reasons, the migration solution can be designed in a way that the sensitive data objects do not leave the SE environment.

Certain embodiments are directed toward an SE with an OS that runs on a virtual machine environment, which can be provided by a platform such as the Java Virtual Machine (JVM). More particular embodiments are directed toward the Java Card OpenPlatform (JCOP) OS. JCOP was developed for use as a smart card operating system for the Java Card platform. In Java Card technology, much of the information is stored in persistent memory so that it is preserved even when power is removed from the card. The information is retrieved from the persistent memory to allow the virtual machine to start again at the next reset. This extends the execution lifetime of the virtual machine operating on the smart card.

The persistent information, which can include user specific (personal) data, includes the Java objects of the installed applets, and the Java objects and native data structures of the operating system. When there is an update to the operating system, the Java classes and native data structures might change in a way that backward compatibility for stored objects, and other data, is not be preserved. Accordingly, embodiments of the present disclosure are directed toward providing a data transformation between the old and new operating system in order to provide the desired compatibility between the data objects stored in the persistent storage and the new operating system.

Certain embodiments of the present disclosure are directed toward migration for native data structures and memory layout for the OS update. Java applications and frameworks sometimes deal directly with native data. Native data is memory that is allocated outside the Java heap. Native data might include operating system data structures, transmitted data, data streamed from a file, and data that is shared with a non-Java application.

Figure 1:
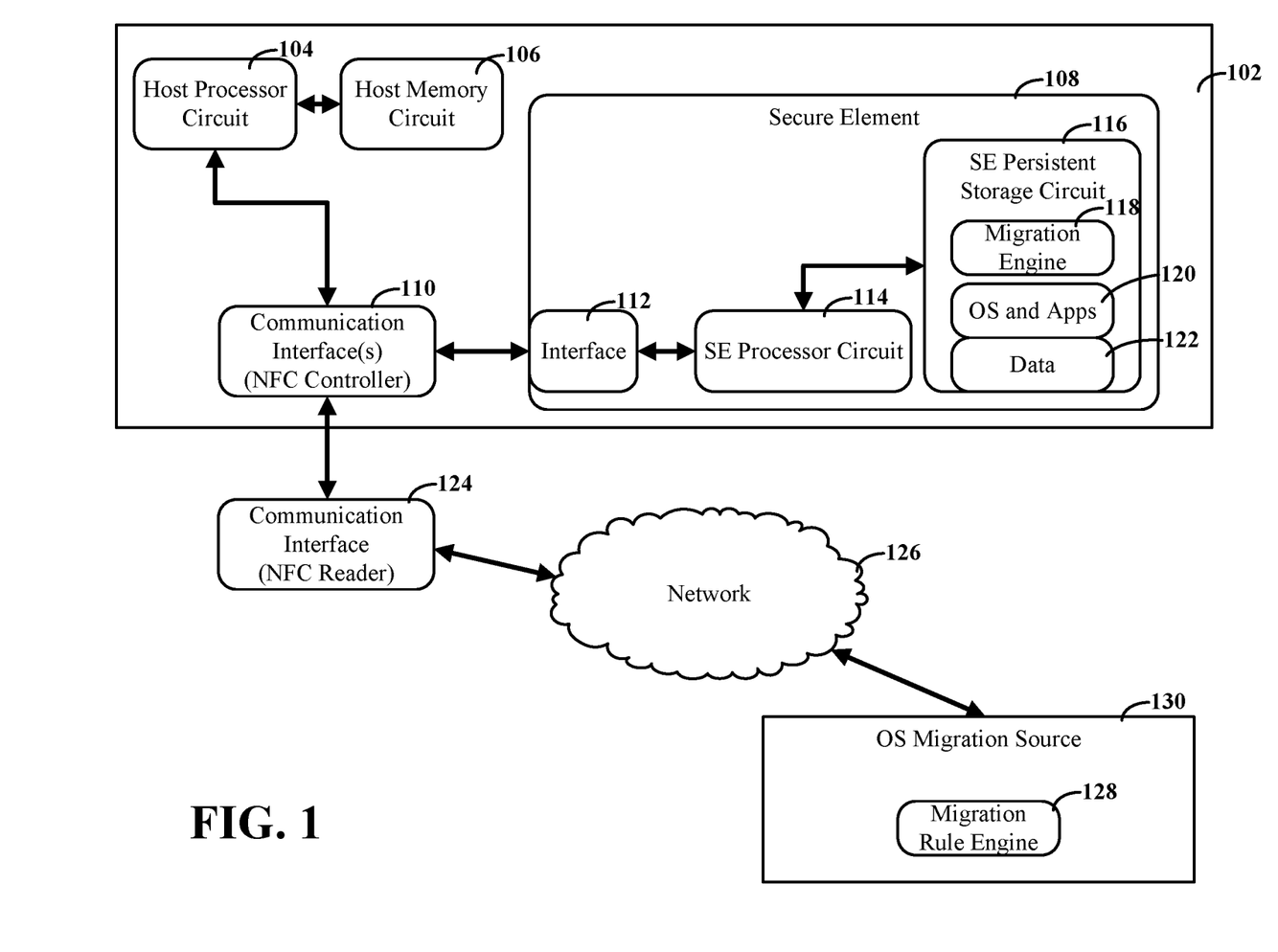
FIG. 1 is a block diagram of a system replacing a current operating system stored in a persistent storage circuit of an SE, consistent with embodiments of the present disclosure.

FIG. 1 is a block diagram of a system replacing a current operating system stored in a persistent storage circuit of an SE, consistent with embodiments of the present disclosure. A secure device 102 includes a SE 108 with a persistent (non-volatile) storage circuit 116. The persistent storage circuit 116 can be implemented using a variety of different memory types including, but not limited, to various types of flash memory circuits. The persistent storage circuit 116 can store an OS and software applications 120. Also stored in the persistent storage circuit is a migration engine 118 and sensitive (user) data 122. The OS and software applications can be configured to use data 122 for various functions (e.g., authentication or financial transactions). SE processor circuit 114 (e.g., a microcontroller circuit) interfaces with the persistent storage circuit 116 to retrieve and then execute the instructions for the OS and applications 120, and also to retrieve and use the sensitive data 122.

According to various embodiments, the secure device 102 can be configured with a host processor circuit 104 and corresponding host memory circuit 106. The use of a separate host processor circuit 104 allows the SE to be self-contained in many respects. For instance, access to the SE can be limited by way of an interface circuit 112. The interface circuit 112 along with the SE processor circuit 114 can be configured to limit the types of transactions that can take place with circuits that are external to the SE 108. More particularly, the SE 108 can be configured to interface with external circuits using a SE application program interface (API). The API can define access rules that control access to the SE 108 and its persistent storage circuit 116.

The secure device 102 can also include one or more communication interfaces 110, which are designed to communicate with remote devices. The communication interfaces can be designed for use with a variety of different protocols and underlying physical layer solutions. A particular, non-limiting, example uses NFC. Various embodiments are discussed in the context of NFC, however, it is understood that the embodiments are not necessarily limited to NFC. Consistent with certain embodiments, a communication interface 124 (e.g., a device that serves as an NFC Reader) can be configured to communicate with the secure device 102 using one or more of the communication interfaces 110.

According to various embodiments, the communication interface 124 can be used to receive updates to the OS of the SE 108. For some embodiments, such as a contactless card, some or all of the update can be provided over an NFC interface. An NFC controller of the secure device 102 could provide the updates directly to the SE 108. In certain embodiments (e.g., on a smart phone) the update can be broadcast over network 126 (e.g., over the Internet) to multiple secure devices and the host/application processor of each secure device 102, which then forwards the update information to the SE 108.

Consistent with one or more embodiments of the present disclosure, an OS migration source 130 can include a migration rule engine 128 that is configured to generate a set of migration rules that specify changes to a set of data object types corresponding to the current operating system. For example, the migration rule engine 128 can use OS metadata to determine changes to object types that are caused by the OS update. A corresponding set of migration rules can then be automatically generated based upon these changes. For example, the name of an object type or a field within the object type might change. A corresponding migration rule can be created that replaces the old name with the new name for all objects of the particular type. The automatic transformation rules can be series of commands that can be interpreted and executed by the migration engine 118. In certain embodiments, the migration rule engine 128 can include an interface that allows an authorized user to manually provide migration rules, or adjust some of the automatically generated migration rules.

Various embodiments of the present disclosure are directed toward the generation of a set of finalization rules that can be executed by the SE after the migration rules are implemented. This separation can be particularly useful for implementing relatively complex changes that are more readily carried out after the OS has been updated. For example, complex changes might not be possible before the OS is updated due to interdependencies between data objects, memory configurations, data arrays, and other aspects. For instance, the complex changes could include resizing data arrays, creating entirely new objects, and changing the content within data objects.

According to certain embodiments, the OS migration source 130 can be implemented using one or more computers that are configured to operate as an OS update server. The OS update server can be configured to broadcast the OS update and the migration rules to a large number of secure devices 102. The migration rules engine's ability to generate migration rules at the object type level (as opposed to being specific to particular data objects in each secure device 102) can be useful for updating large number of secure devices using the same basic update package.

According to various embodiments, the persistent storage circuit 116 can store one or more third party applications (e.g. payment applications) in the form of executable code that is not subject to transformation. The third party applications can access data objects through an API provided by the OS. In instances where the API remains unchanged, from the perspective of the third party applications, the third party applications still will be able access the data objects after they are transformed by the update rules.

Various embodiments allow for the migration engine 118 to be executed within a standalone OS. When an update is received from the OS, the current OS can be halted and the standalone OS can be started. The migration engine 118 can operate from within the standalone OS to carry out the transformations indicated by the migration rules. Once the transformations are complete, control can be handed off to the updated OS.

Consistent with certain embodiments, migration engine 118 can be provided as be part of the new OS. When the new OS is first started, the new OS can start the migration engine 118. Once the transformations are completed, the migration engine code can be deleted from SE.

In certain embodiments, the migration engine 118 might be implemented within the current (old) OS. The OS can be configured to halt transactions to the data objects, so as to free up the data objects for transformation. This can include suspending other applications and APIs that might otherwise access the data objects. The migration engine 118 can then be started.

Figure 2:
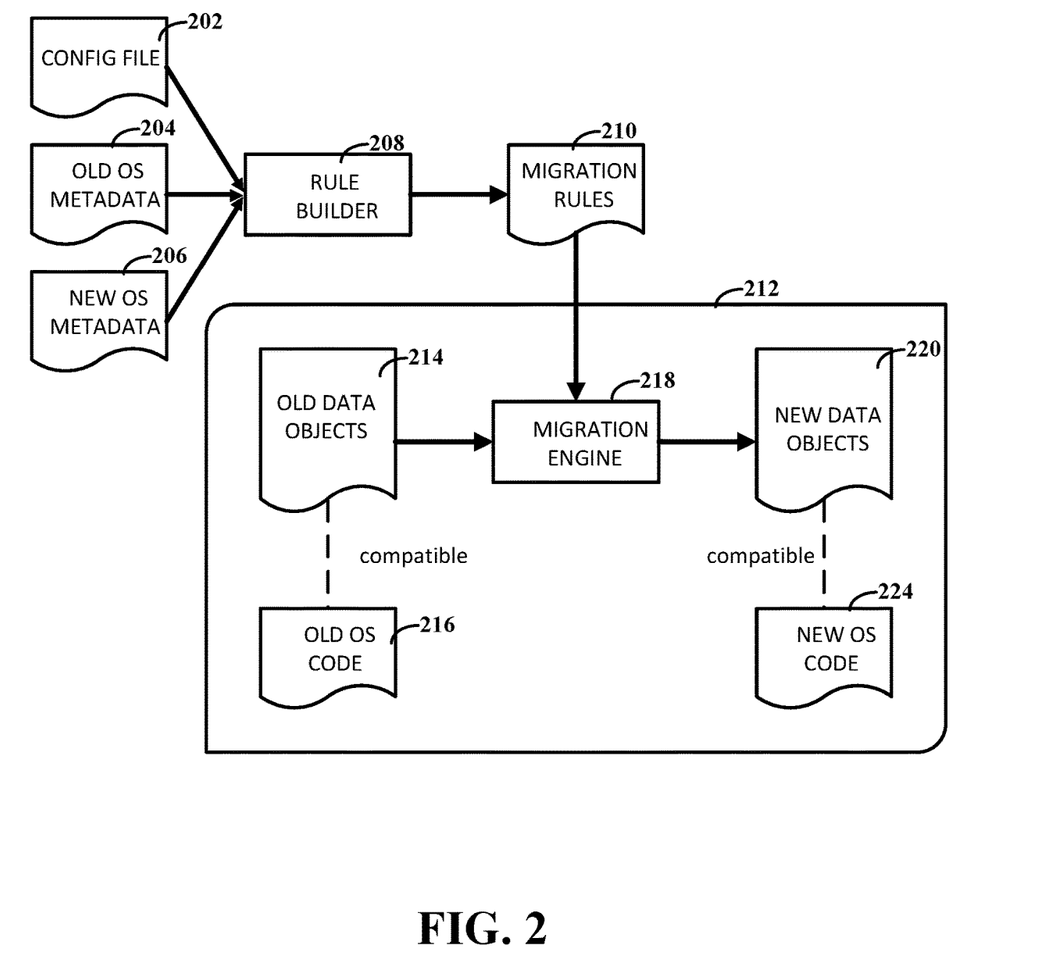
FIG. 2 is a block diagram showing data flow for the replacement of a current operating system stored in a persistent storage circuit of an SE, consistent with embodiments of the present disclosure.

FIG. 2 is a block diagram showing data flow for the replacement of a current operating system stored in a persistent storage circuit of an SE, consistent with embodiments of the present disclosure. The rule builder 208 corresponds to the migration rule engine 128 from FIG. 1 and is configured to identify changes between the old and new OSes. This can include comparing the metadata of the old OS 204 and with the metadata of the new OS 206. The configuration file 202 can specify additional details, such as providing an initialization value for newly added fields. The configuration field 202 could also include information such as the correlating between fields or classes that were renamed. The memory layout of the old and new OSes is also compared and used to generate migration/transformation rules.

In the context of a Java-based OS, the metadata can include files that specify the Java classes and Java packages can be used to group similar class types together. Each individual SE could have multiple instances of the same type of class. For example, a class could be named "CreditCard" and specify various fields contained within the class and an individual SE might create multiple instances of CreditCard objects (e.g., one instance for each different credit card owned by a user). The rule builder 208 can correlate the metadata files for the new and old OS in order to identify differences between the Java classes. A few examples of changes that can be identified and added to the automatic rules are: a field is added or removed from a Java class; fields are re-ordered in a Java class; fields are changed to static or to instance type; a Java class is moved to another package; a Java class or package is removed.

Using the various sources of information about the update, the rule builder 208 generates a set of migration rules 210. The migration rules specify operations that the migration engine 218 performs on old data objects 214 in order to create new data objects 220. Consistent with various embodiments discussed herein, the SE 212 can store the old for the current (old) OS 216 within a persistent storage circuit. A set of old data objects 214, which are compatible with the current OS 216, can also be stored within the persistent storage circuit. The migration engine 218 can transform the old data objects 214 to create the set of new data objects 220, which are compatible with the new OS 224.

According to certain embodiments, the migration engine can be implemented as part of the old operating system. In such implementations, the OS can place itself into a condition suitable for transforming the data before starting the migration engine. As discussed herein, this can include halting processes or otherwise blocking access to the data being transformed during the migration.

In some embodiments of the present disclosure, the migration engine can be implemented as part of the new OS. In such implementations, the old OS can handle the loading of the executable code for the new OS into the persistent storage circuit. The old OS can then handoff control to the new OS, which then initializes the migration engine. According to various embodiments, the migration rules can be stored as part of the compiled package for the new OS. During the initial setup, the new OS executes a set of configuration instructions that link the migration engine to the migration rules and allow the migration engine to carry out the desired transformations.

Various embodiments of the present disclosure are directed toward the use of a standalone migrating OS that can be used during the update process. The old OS can handoff control to the standalone OS that provides an environment for the migration engine to operate within. Upon completion of the transformation by the migration engine, the standalone OS can handoff control to the new OS.

In various embodiments, the migration engine can also be distributed between different combinations of the old OS, a standalone OS and the new OS.

Figure 3:
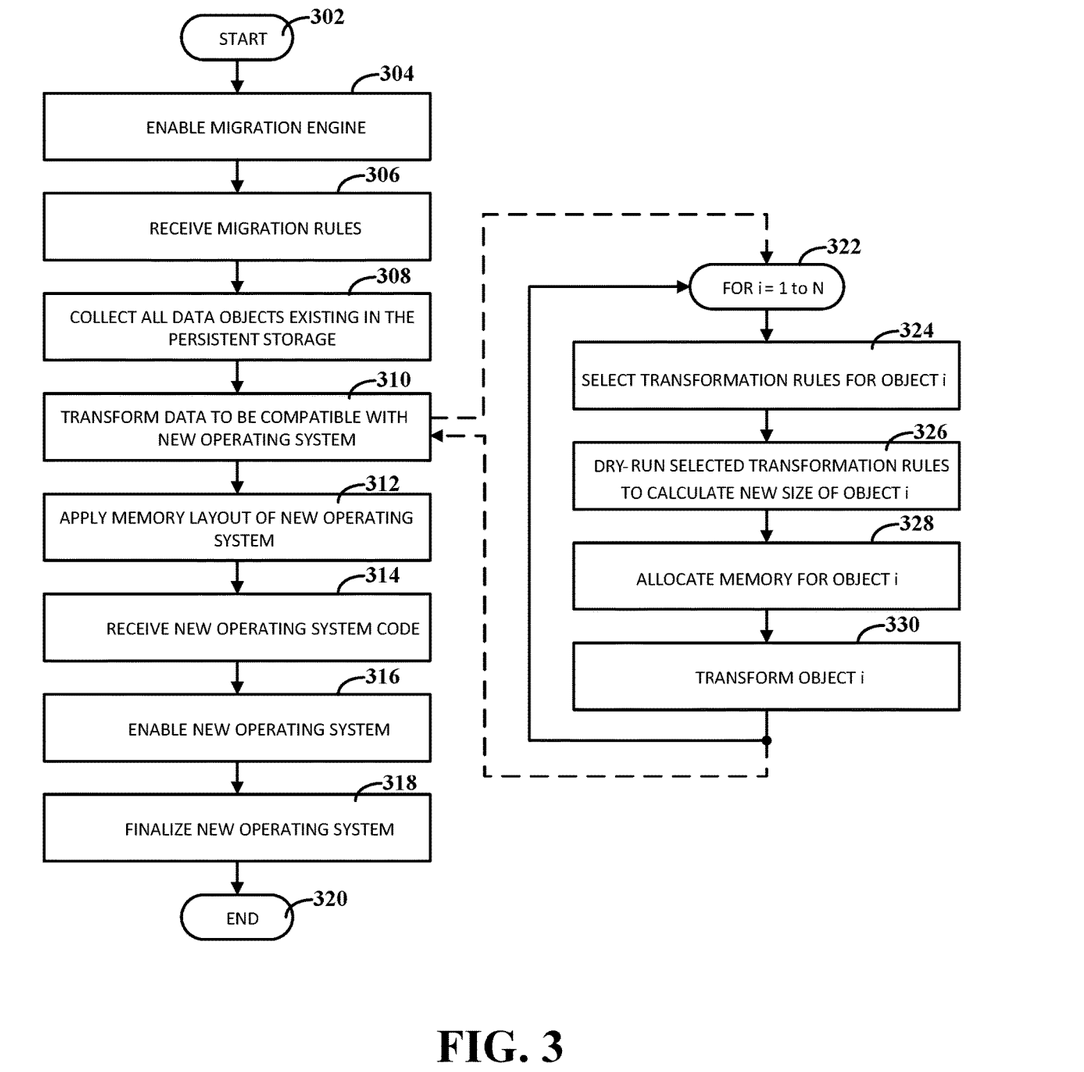
FIG. 3 is a flow diagram for transforming data objects during an OS update, consistent with embodiments of the present disclosure.

FIG. 3 is a flow diagram for transforming data objects during an OS update, consistent with embodiments of the present disclosure. The particular flow shown in FIG. 3 corresponds to embodiments in which the migration engine is part of the old OS or runs within a standalone OS. The flow begins at block 302, which can correspond to receipt of an OS update request at a device that uses an SE that runs the OS. In some instances, this request can originate from an update server that broadcasts the OS update to a large number of devices. In particular embodiments, the OS update request can be generic to all of the devices. This facilitates the use of a single, small OS update package as part of a broadcast communication that is the same for each of the receiving devices.

Each device that receives the OS update request can enable the migration engine, per block 304. In situations where the migration engine is part of the current (old) OS, the migration engine module can be started within the old OS. At the same time, the old OS can be configured to kill, stop, or pause other applications to prevent the sensitive data from being modified during the data migration. The old OS might also disable the API functionality to prevent applications from accessing the data.

The migration engine can then receive the migration rules, per block 306. The migration rules can be received through a secure interface circuit of the SE. In particular embodiments, the OS update request and migration rules are provided using encryption and authentication in order to prevent an unauthorized party from providing false OS updates and migration rules. Consistent with various embodiments, the migration rules can include a set of instructions that identify existing (old) object types and the corresponding changes to be made to the object types. For example, the migration rules can include a list of the object types by their class descriptor. For each object type that is to be changed, the migration rules can identify a corresponding action.

According to various embodiments, the actions can correspond to different levels of modifications. For example, a set of actions could correspond to the class level. At this level, an example action might be "delete class." The action would identify an existing class by its descriptor and indicate that all instances of objects for the class are to be deleted. Another class-level action could be "change package," which could specify a new package for each instance of an object to be moved into. Another level could be the field level, which would involve an indication of a particular field descriptor and the corresponding action. For example, the field descriptor might be "bankID" and the action might be "delete." This means that the new class will no longer contain the "bankID" field. Another action might be "add," which would specify the name, type, and location/order of the new field within the class. Yet another action could be "rename," which could specify a replacement descriptor (e.g., "bankID" becomes "bankID1"). Another action could be "reorder." The reorder action could identify a field by descriptor and then specify a new location/order within the class (e.g., "bankID" is moved to the first descriptor in the class). An action could also correspond to "primitive change," which can identify a field and a new definition for the field (e.g., a field previously defined as an byte primitive becomes a boolean primitive).

The migration rules can be configured to implement a complex combination of rules or actions for the same class. For instance, the migration rules can specify that multiple fields for a particular class could be both moved and renamed, while the class itself is renamed and moved to a different package. In some embodiments, the migration engine is relatively simple in that it is designed to carry out the migration rules in the exact order they are presented. Keeping the migration engine relatively simple can be useful in that the size of the migration engine can be kept small so as not to require a significant amount of memory space. As discussed in more detail with regards to FIG. 4, the migration rules can therefore be carefully ordered so that the individual actions do not create conflicts.

The migration engine can then collect or identify all the existing (old) data objects within the persistent storage, per block 308. According to certain embodiments, this can be done by having the OS maintain a list or array that identifies each instance of an object that has been created. The migration engine can access the list to identify the instances for each class that is subject to a migration rule. Moreover, the migration engine can be configured to obtain information from an object header. In particular, each object, whether it is a Java object or native object can have an object header. The object header can be stored either along with the object itself, or in a separate area dedicated to the object headers. The object header has a type field that can indicate, for example, whether the object is: a native object, an object of a Java class, a byte array, short array, or an object array. For native object, other fields in the header can identify the type of the native object. For Java class objects, a class identifier in the header can identify the package and class of the object.

Therefore having access to the header can provide enough information to the migration engine to select the appropriate rules.

Consistent with various embodiments, differences in the memory layout between the old and new OS can result in issues with headers or other data. For example the area where the headers are stored and the header structure can each change. In embodiments where the migration engine is implemented in either the new OS or in a standalone OS, then the migration engine can be designed to access the headers in the old OS, and to interpret them properly. Similarly the header location and structure of the new OS can also include relevant information that can be used by the migration engine to properly implement the transformations.

The migration engine can then transform the data according to the migration rules so that the data is compatible with the new OS, per block 310. As a particular example of how the transformation can be implemented, the migration engine can perform an iterative process as shown by blocks 322-330. The process can repeat N times, where N is the number of data objects to be transformed, per block 322. Alternative, N can be the total number of data objects in the SE and certain iterations might not have any transformations carried out. The migration engine identifies the current object along with selecting the corresponding subset of migration/transformation rules, per block 324. For instance, the migration engine can access object i from a list of all objects and identify the corresponding class of the object. The migration engine can then retrieve a subset of the migration rules that correspond to the identified class.

Using the identified object and corresponding set of migration rules, the migration engine can calculate the size of the identified object after it is transformed, per block 326. For example, the migration engine can be configured to simulate the transformation in order to calculate the resulting size of the object after the transformation. In some embodiments, the simulation can be accomplished without changing the object by calculating the data size change resulting from each transformation. For example, the migration engine can run through each transformation instruction separately to keep a running tally of the corresponding change in object size.

Based upon the determined size, the migration engine can then allocate memory in the persistent storage per block 328. The allocation corresponds to the memory space for the new OS. The object can then be transformed and moved to the new memory space, per block 330. For example, a new instance of an object of the class can be created according to the new class definitions. The fields of the new object can then be assigned using values from the old object, thereby preserving the sensitive (user) data.

Moreover, objects that are to be preserved but do not have any corresponding migration rules, are also re-created. In this case the size of the object does not change, and the data object is copied as is to the new area using the same size of memory allocation as the old OS. The allocation can change based upon the memory space and the memory allocation strategy of the new OS. For example, object alignment and granularity of the old and new OS can be different.

According to embodiments, the allocation strategy and object header creation method can be implemented in an executable code that is also sent to or compiled into the migration engine. In some instances, the code can be provided by a developer with knowledge of the memory differences relating to the OS update.

After all of the objects are transformed, the migration engine can apply the memory layout for the new operating system, per block 312. An example of a memory layout change that can be handled at this juncture might arise when the persistent heap of old OS and new OS overlap within the memory space. The migration engine can be configured to allocate all the objects within a temporary memory area to preserve the corresponding data. The heap is copied from the temporary location to the final location valid for new OS, i.e. the memory layout of the new OS is applied. This avoids overwriting data in the overlapping memory space before it has been copied or moved.

Beside the data objects there might be other persistently stored information, e.g. metadata for the memory management and object management modules. If their locations differ in the 2 OSs, then a re-location can also take place here.

The new OS code is also accessed and received by the SE, per block 314. In some embodiments, the migration rules can be provided separately from the OS code. In other embodiments, the OS code is received at the same time as the migration rules. In either case, the new OS can be enabled by executing the initialization portion of the OS code, per block 316. The SE can then carry out finalization actions, per block 318. According to various embodiments, the finalization actions can include transformation related items that are not addressed during the transformation indicated by block 310. For example, dependencies between objects may make it difficult or impossible to complete the necessary transformation until the transformations of block 310 are completed. As one example, the migration rules of block 310 might include the creation of new objects. The creation of a new object of a class (whether or not the object definition changed between old and new OS) requires that the constructor of the class is to be called. In some instances, this might also invoke executable Java code that is not visible to the migration engine. Therefore new object allocation can be implemented from within the new OS, in the finalization step. Moreover, new elements do not exist in the old data, so the migration engine does not have any reference to these new elements until after they are created. Accordingly, references to the new elements can be created after the elements are created by include the necessary instructions as part of the finalization instructions for the finalization of block 318. The process ends at block 320.

A particular, non-limiting, example of a set of finalization rules is described in connection with a Java class called CreditCard. The example Java class CreditCard includes the following fields before migration:

short bankId byte[ ] name (this is a reference pointing to a byte array object)

byte[ ] address (this is a reference pointing to a byte array object)

pin (this is a reference pointing to an object of class SecurePIN)

In new OS there is an additional secondary PIN that is added as indicated by the following arrangement of fields:

short bankId byte[ ] name (this is a reference pointing to a byte array object)

byte[ ] address (this is a reference pointing to a byte array object)

primaryPin (this is a reference pointing to an object of class SecurePIN)

secondaryPin (this is a reference pointing to an object of class SecurePIN)

A set of migration rules might specify that for object instances of the CreditCard class the pin field is renamed to primaryPin while the reference to the existing SecurePin object is kept. The secondaryPin is then initialized to null reference, as the old data does not include any SecurePin objects for the secondary pin field. The finalization rules would then specify that new SecurePin object be created for each of the CreditCard objects. The new SecurePin objects would then be assigned a corresponding reference to the secondaryPin field. In some embodiments, the finalization rules can include additional instructions. For example, the value of the new SecurePin objects can be initialized to a desired value (e.g., the same as the primaryPin or a value derived from the primaryPIN). Moreover, the finalization rules can distinguish based upon the specific details of the individual objects. For instance, there might be a first rule for objects having a bankID field that corresponds to BankA and a second, different rule for objects having a bankID field that corresponds to BankB.

Figure 4:
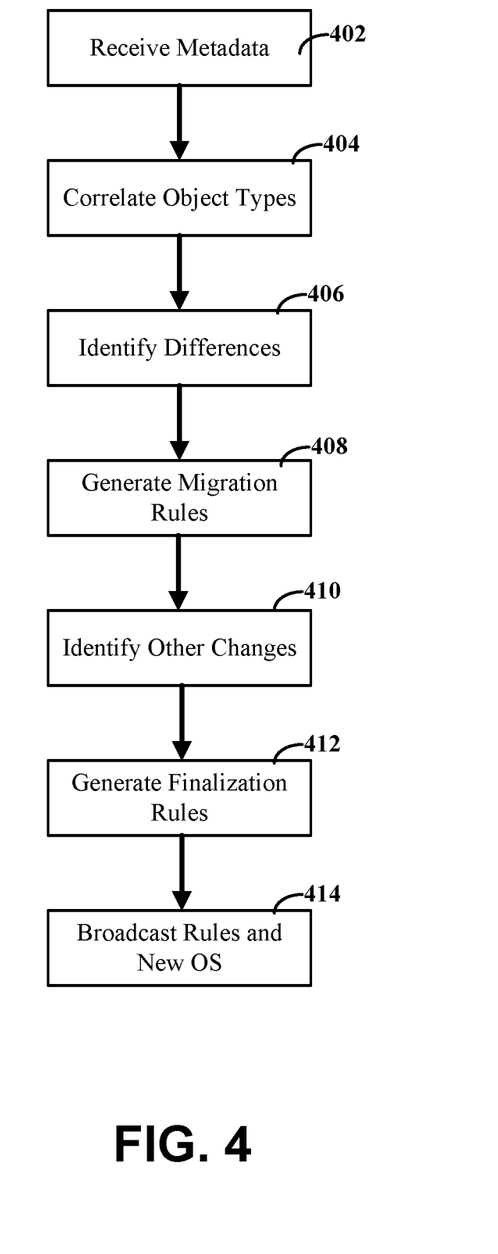
FIG. 4 is a flow diagram for the generation and broadcast of migration rules, consistent with embodiments of the present disclosure.

FIG. 4 is a flow diagram for the generation and broadcast of migration rules, consistent with embodiments of the present disclosure. According to various embodiments, the generation and broadcast of the migration rules can be carried out using one or more computer servers, such as the OS migration source and migration rule engine discussed in connection with FIG. 1. The migration rule engine can access and receive metadata about the old and new OS and their corresponding objects, per block 402. For a Java implementation, the metadata can include the class definitions stored within class files and corresponding Java packages. In certain embodiments, the metadata can also include additional information that can be manually provided. This can include, for example, express correlations between classes, fields, or other elements.

The migration rule engine can then correlate the object types/classes between the old and new classes, per block 404. For example, the migration rule engine might first identify all classes that have the same name. The migration rule engine might then start from the assumption that the old and new versions correspond directly to one another. The migration rule engine can then look at the remaining class definitions and compare their structures to identify similarities. In certain embodiments, the migration rule engine can account for changes in the name of a class by correlating classes with different names so long as they meet a threshold level of similarity (e.g., at least 70% of fields have the same name and structure). In particular embodiments, the migration rule engine can present the classes correlated in this fashion for approval by an authorized reviewer.

For correlated classes, the migration rule engine identifies differences between the old and new classes, per block 406. In this manner, the migration rule engine can compile a list of the identified changes for each class. For example, the migration rule engine can attempt to correlate the individual fields within the classes in much the same way that the classes were correlated, e.g., by starting with fields that have the same name and then identifying fields with different names but other similarities. The migration rule engine can then identify any differences between the correlated fields and store them in the list of changes for each corresponding class.

Based upon the identified changes, the migration rule engine can next generate a set of migration rules, per block 408. For example, the migration rule engine can classify each of the identified changes based upon the available transformation instruction types (e.g., rename, add, delete, etc.). An instruction can then be generated for the class and each corresponding change. For instance, the instruction to rename a field in a class might be formatted as: rename_field [old_field] [new_field]. Consistent with various embodiments, the migration rule engine can order the instructions to avoid potential conflicts between instructions. For instance, if there are nested classes the migration rule engine can be configured to rename the objects of the nested class before updating corresponding references in the encapsulating class.

The migration rule engine can then identify other changes that might be necessary to account for the OS update, per block 410. In particular embodiments, these additional changes correspond to changes carried out after the new OS has been initialized. Thus, the additional changes can include complex changes such as, resizing arrays, creating new objects, and changing data content (e.g., applying an algorithm to existing data of each corresponding object). Based upon the additional changes, the migration rule engine can generate a set of finalization rules, per block 412. Consistent with various embodiments, the finalization rules can be a set of executable codes that can be run on-card by the migration engine within the new OS environment.

The migration rules, finalization rules, and OS updates can then be broadcast to secure devices SEs running the old OS, per block 414. In certain embodiments, the broadcast can be sent first to authorized devices that are in communication with the secure (SE) devices. The authorized devices could be, for example computers, NFC readers, or other devices and the transmission could be over a wide-area-network (WAN) such as the Internet.

According to certain embodiments, the secure devices in the field may be running different versions of the OS on their respective SEs. Accordingly, the migration rule engine can be configured to generate multiple sets of migration rules and finalization rules relative to the different OS versions. These rules sets can be broadcast to each of the secure devices. The migration engine for each of the secure devices can select the appropriate set of rules based the OS version that is currently running on the SE of that device. Alternatively the host processor can select the appropriate set of rules after retrieving the OS version of the SE, and only forward the selected set to the SE. This approach may have certain advantages if the Secure Element does not have the sufficient communication bandwidth and transient/persistent memory to receive and store multiple sets of rules. This allows the same OS update and migration sets to be still broadcast to each phone, without using as much of the bandwidth of the SE.

The various terminology used in the Specification (including claims) should be given their ordinary plain meaning in the art unless otherwise indicated. As examples, the Specification describes and/or illustrates aspects useful for implementing the various embodiments by way of circuits or circuitry. In some instances, the configuration of the circuitry can described and illustrated using, for example, blocks, modules, devices, systems, units, controllers, or engines. Such circuits or circuitry can be discussed in relation to how they are used together and with other elements in order to describe certain embodiments relative to their related structures, steps, functions, or operations. For example, in certain of the above-discussed embodiments, one or more modules are discrete logic circuits or programmable logic circuits configured and arranged for implementing these operations/activities, as may be carried out consistent with the approaches shown in the Figs. In certain embodiments, the various modules can be implemented using one or more computer processing circuits and memory circuitry. The memory circuitry can store and access a set (or sets) of instructions (and/or to be used as configuration data to define how the computer processing circuit is to perform), which can be executed in order to implement an algorithm or process as described in the disclosure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method for replacing a current operating system stored in a non-volatile storage circuit of a secure element with a new operating system, the method comprising:
   receiving a set of migration rules that specify changes to a set of a plurality of data object types;
   identifying, based upon the set of migration rules, data objects stored in the non-volatile storage circuit and corresponding to the set of the plurality of data object types;
   for each of the identified data objects:
      selecting a subset of the set of migration rules that correspond to a data object type of the set of the plurality of data object types that corresponds to a particular data object of the identified data objects, and
      transforming the particular data object by redefining a data structure of the particular data object according to the selected subset of the set of migration rules and while preserving data in the particular data object stored in the non-volatile storage circuit and associated with the data structure as redefined, wherein the data resides on the non-volatile storage circuit before, during, and after the transformation such that the data is preserved in the transformed particular data object as transformed data to be compatible with the new operating system, wherein the new operating system is different from the current operating system;
   receiving the new operating system in the secure element; and
   enabling the new operating system stored in the non-volatile storage circuit of the secure element to replace the current operating system, the transformed data being configured for access by the new operating system.

2. The method of claim 1, wherein the data structure of the particular data object is redefined according to the selected subset of the set of migration rules and while preserving data stored in the persistent storage circuit, the method further comprising:
   receiving a set of finalization rules that specify additional changes to data stored in the non-volatile storage circuit; and
   modifying, based upon the set of finalization rules, the data stored in the non-volatile storage circuit, wherein the data objects include the data and are stored in the non-volatile storage circuit and the secure element includes the storage circuit, wherein the data residing on the non-volatile storage circuit of the secure element does not leave the secure element during the transformation of an operating system of the secure element to the new operating system.

3. The method of claim 2, wherein the data includes user data that is preserved while enabling the new operating system and without the user data leaving the secure element, wherein the secure element includes a processor circuit and the non-volatile storage circuit and the current operating system provides a virtual machine environment for the secure element, and the modification of the data stored in the non-volatile storage circuit includes redefining the data structures of the data objects while preserving the persistent data, wherein the modification includes a set of actions selected from the group consisting of changing a field, deleting a field, adding a new field, reordering field locations or orders, and redefining a field, and combinations thereof.

4. The method of claim 3, wherein method is carried out without the data objects leaving the secure element and wherein enabling the new operating system includes replacing the current operating system with the new operating system stored in the non-volatile storage circuit using the set of migration rules including assigned values from the data associated with the particular data object to a new data object corresponding to the new operating system.

5. The method of claim 3, wherein at least some of the data modified based upon the set of finalization rules is native to the secure element, and wherein transforming the particular data object by defining the data structure includes assigning fields of a new version of the particular data object using values from the particular data object, thereby preserving the data.

6. The method of claim 3, wherein at least some of the data modified based upon the set of finalization rules corresponds to new data objects added with the new operating system.

7. The method of claim 1, wherein the secure element is part of a smart card and the data objects include personal data, wherein the data object types are identified based on associated class descriptors.

8. The method of claim 1, further comprising receiving additional sets of migration rules and selecting a particular set based upon a version of the current operating system, wherein the plurality of data object types are selected from the group consisting of a native object, an object of a Java type, a byte array, a short array, an object array, and combinations thereof.

9. The method of claim 1, further comprising halting, during the transforming, access to the data objects and allowing the data objects within a temporary memory location to preserve the data.

10. An apparatus comprising:
   a secure element circuit that includes:
      a non-volatile storage circuit that is configured to store data objects and a current operating system; and
      a processor circuit coupled to the non-volatile storage circuit and configured to:
         receive a set of migration rules that specify changes to a set of a plurality of data object types;
         identify, based upon the set of migration rules, data objects stored in the non-volatile storage circuit and corresponding to the set of the plurality of data object types;
         for each of the identified data objects:
            select a subset of the set of migration rules that correspond to a data object type of the set of the plurality of data object types that corresponds to a particular data object of the identified data objects by redefining a structure of the particular data object, and transform, based upon the selected subset, the particular data object while the data object remains stored in the non-volatile storage circuit such that data in the particular data object is preserved in a transformed state that is compatible with the new operating system, wherein the new operating system is different from the old operating system; and enable a new operating system as stored in the non-volatile storage circuit of the secure element to replace the current operating system stored in the non-volatile storage, the transformed data being configured for access by the new operating system.

11. The apparatus of claim 10, wherein the data resides on the non-volatile storage circuit before, during, and after the transformation, and wherein the processor circuit is further configured to:

receive a set of finalization rules that specify additional changes to data stored in the non-volatile storage circuit; and modify, based upon the set of finalization rules, the data stored in the non-volatile storage circuit while preserving persistent data.

12. The apparatus of claim 10, wherein the processor circuit is further configured to provide a standalone operating system within which each the particular data object is transformed, and wherein the structure of the particular data object is redefined according to the selected subset of the set of migration rules and while preserving data stored in the non-volatile storage circuit, the data includes user data that is preserved while enabling the new operating system and without the user data leaving the secure element circuit.

13. The apparatus of claim 10, wherein the processor circuit is further configured to maintain the particular data object within the secure element circuit while the particular data object is transformed.

14. The apparatus of claim 10, wherein the processor circuit is further configured to run the new operating system within a virtual machine environment.

15. The apparatus of claim 10, wherein the processor circuit is further configured to receive additional sets of migration rules and select a particular set based upon a version of the current operating system.

16. The apparatus of claim 10, wherein the processor circuit is further configured to halt access to the data objects while the data objects are transformed.

17. A computer-implemented method for generating a set of migration rules for updating a current operating system stored in a non-volatile storage circuit of a secure element to a new operating system, the method comprising:

receiving operating system metadata for the current operating system and the new operating system, the metadata describing object type definitions;

correlating, based upon the metadata, a plurality of object types in the current operating system with a plurality of object types in a new operating system;

identifying differences between the correlated plurality of object types;

generating, based upon the identified differences, a set of migration rules that specify changes to objects corresponding to the correlated plurality of object types and wherein the set of migration rules include rules for redefining a structure of a particular data object of a particular object type of the plurality of object types while the data remains stored in the non-volatile storage circuit, the migration rules being configured to transform data in the particular data object for operation with the new operating system, wherein the new operating system is different from the current operating system;

broadcasting the set of migration rules and the new operating system to to the secure element for storage in the non-volatile storage circuit; and enabling the new operating system to replace the current operating system in the non-volatile storage circuit.

18. The method of claim 17, further comprising:

identifying, based upon differences between the current operating system and the new operating system, changes that include at least one of resizing of data arrays, creation of new data objects, and changing content of stored data associated with the correlated plurality of object types; and generating executable code to implement the changes to objects corresponding to the correlated object types.

19. The method of claim 17, wherein the generating the set of migration rules that specify changes to the objects further includes providing identification of data objects that include data and that are stored in the non-volatile storage circuit of the secure element.

20. The method of claim 17, wherein the generating the set of migration rules that specify changes to the objects further includes:

providing identification of data objects that include data and that are stored in the non-volatile storage circuit of the secure element; and specifying modifications to a data structure of the data objects to occur, and while preserving the data as stored on the non-volatile storage circuit of the secure element during a transformation of the data objects based on the set of migration rules, for enabling the new operating system.

* * * * *